May 4, 1965 J. F. GULICK, JR., ETAL 3,181,813
INTER-FEROMETER HOMING SYSTEM
Filed Aug. 10, 1956 3 Sheets-Sheet 1

JOSEPH F. GULICK, Jr.
THOMAS D. JACOT
HARLAN H. KNAPP, Jr.
HILARY H. NALL
INVENTORS

BY
ATTORNEYS

JOSEPH F. GULICK, Jr.
THOMAS D. JACOT
HARLAN H. KNAPP, Jr.
HILARY H. NALL  INVENTORS

May 4, 1965  J. F. GULICK, JR., ETAL  3,181,813
INTER-FEROMETER HOMING SYSTEM
Filed Aug. 10, 1956  3 Sheets-Sheet 3

JOSEPH F. GULICK, Jr.
THOMAS D. JACOT
HARLAN H. KNAPP, Jr.
HILARY H. NALL
INVENTORS

BY
ATTORNEYS

United States Patent Office 3,181,813
Patented May 4, 1965

3,181,813
INTER-FEROMETER HOMING SYSTEM
Joseph F. Gulick, Jr., Silver Spring, Thomas D. Jacot, Spencerville, and Harlan H. Knapp, Jr., and Hilary H. Nall, Silver Spring, Md., assignors to the United States of America as represented by the Secretary of the Navy
Filed Aug. 10, 1956, Ser. No. 603,460
7 Claims. (Cl. 244—14)

The present invention relates to an interferometer homing system for steering guided misiles. More specifically, the present invention resides in an improved means for determining the rate of change of the true bearing of a radiating object, employing in the process two separated horn-type antennae mounted upon guided missiles.

A prior interferometer type homing system is disclosed in the pending application for "Homing Guidance System," by C. W. Brown, B. D. Dobbins, and A. B. Reppert, Serial No. 319,624, filed November 10, 1952. In the apparatus of that system, however, false steering signals frequently arise as a result of oscillator drift. In addition, the gyroscope compensation factor, N, occasionally varies from the desired value, with the result that the missile may become unstable and fail to function. Moreover, painstaking efforts to match and to compensate thermally certain components of the prior device are required for the proper operation thereof.

The present invention is advantageous in that the discriminator required in the prior system is eliminated. Thus, the principal source of bias existing in the prior system, namely, oscillator drift, is removed. In addition, none of the components of the present system are sensitive to the temperature variations normally encountered in use, and neither are regulated electrical power sources nor frequency stabilized oscillators a requirement thereof.

It is an object of the present invention to provide an interferometer homing system which produces a steering signal in which there appears no false information in the form of biases.

It is another object of the present invention to provide an interferometer homing system in which the gyroscope compensation factor N remains fixed throughout the flight of the missile.

A further object of the present invention resides in the provision of an interferometer homing system which does not require regulated sources of electrical power for operation.

Other objects and many of the attendant advantages of this invention will be readily appreciated as the same becomes better understood by reference to the following detailed description when considered in connection with the accompanying drawings, wherein.

Figure 1:
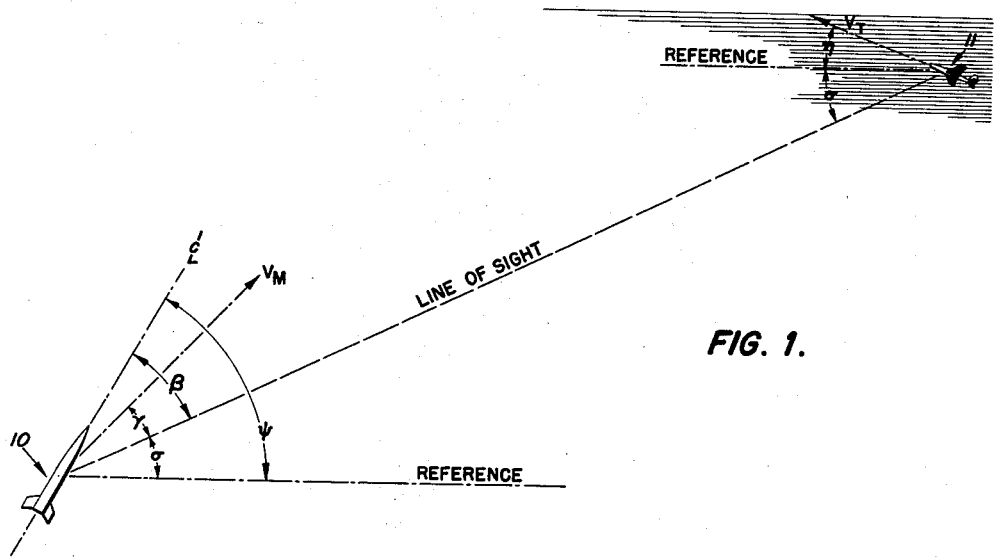
FIG. 1 is a diagram illustrating the geometry applicable to a proportional system of navigating a missile to a point of interception with a target.

In FIG. 1, a missile 10 is shown heading in the general direction of a target 11. It is desired that the course of the missile will be such that eventually a collision between the missile 10 and target 11 will result. A necessary condition for a collision course is that the true bearing of a line-of-sight from missile to target be fixed. In order that the line-of-sight be fixed, the relative velocity between the missile and target in a direction transverse to the light-of-sight must be zero. The condition for a collision course may be expressed mathematically as $$\frac{d\sigma}{dt}=0 \tag{1}$$

where $\sigma$ is the bearing angle of the line-of-sight from the missile to the target with respect to an arbitrary reference. By inspection of FIG. 1, it is evident that $$\sigma=\psi-\beta \tag{2}$$

where:

$\psi$ is the angle separating the missile axis and the reference; and $\beta$ is the angle separating the missile axis and the line-of-sight.

It follows from Equation 2 that $$\frac{d\sigma}{dt}=\frac{d\psi}{dt}-\frac{d\beta}{dt}$$

or employing the dot notation to symbolize differentiation with respect to time, $$\dot{\sigma}=\dot{\psi}-\dot{\beta} \tag{3}$$

It will be remembered that the condition for a collision course is that $\dot{\sigma}$ equal zero. Therefore, if $\dot{\sigma}$ is measured and determined to be other than zero, the missile is not on a collision course. When $\dot{\sigma}$ is utilized as the error signal in a steering system comprising a closed loop servo system, the missile will continuously steer a course directed to minimize $\sigma$ and thereby attain a collision with the target. The accuracy of missile homing obviously depends upon the accuracy with which the quantities $\psi$ and $\beta$, or their derivatives $\dot{\psi}$ and $\dot{\beta}$ are measured. Since $\psi$ is purely a rotation of the missile, either $\psi$ or its derivative, $\dot{\psi}$, is easily measured by means of a gyroscope. The quantity $\beta$ is measurable only approximately by means of a radar interferometer. To understand more fully the present invention, comprehension of the operation of a radar interferometer is necessary.

Figure 2:
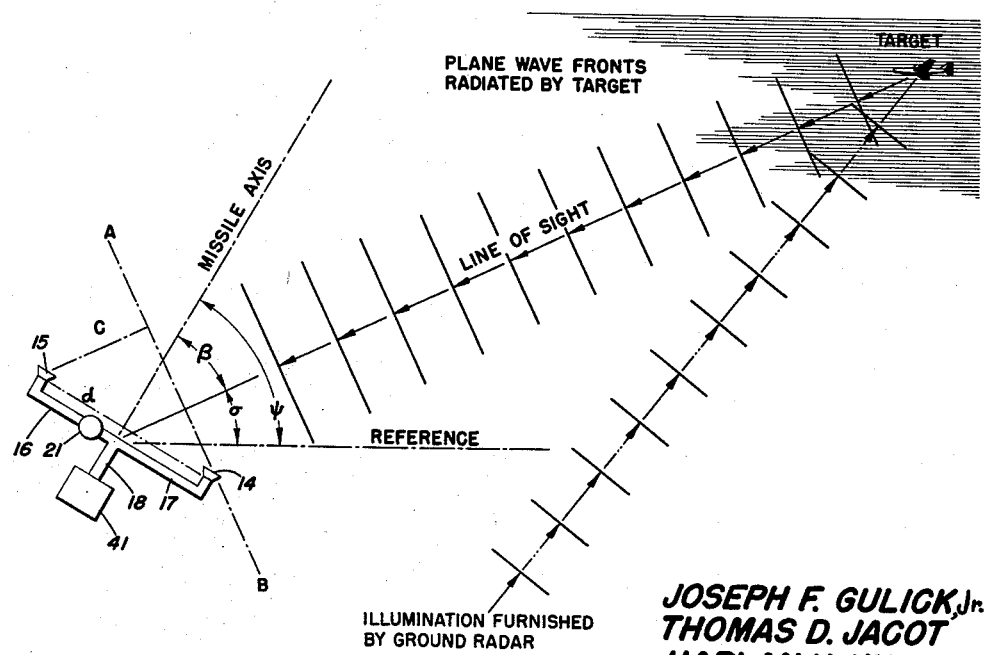
FIG. 2 is a diagram illustrating the operation of a radar interferometer.

In FIG. 2, a diagrammatic representation of a radar interferometer is given. It will be understood that the missile to target range is sufficiently great that radiation emitted by the target can be regarded as having emanated from a point source. Of course, the target need not generate the waves emanating therefrom, as the interferometer will function equally well upon reflected waves originally transmitted by a ground based, illuminating radar. It is sufficiently accurate as well, for present purposes, to assume that the energy upon arrival at the missile is disposed into plane wave fronts.

The target is shown angularly displaced from the missile axis by the amount $\beta$. Two antennae, 14 and 15, separated by the distance $d$ are mounted on the forward end of the missile to receive radiation from the target. The voltages induced in the antennae 14 and 15 are conducted therefrom by the waveguide branches 16 and 17 and combined to produce a single signal voltage in a suitable junction 18.

The signal voltage available at junction 18 can be easily determined by a consideration of the wave front A–B. At any time, the voltage induced in antenna 14 will be $$e_{14} = E \cos \omega t \qquad (4)$$

where:

E is the peak amplitude of the voltage induced in antenna 14; and
$\omega$ is the frequency of the incident radiation expressed in radians per second.

Since wave front A–B must travel the additional distance C before inducing a peak voltage in antenna 15, the voltage $e_{15}$, induced in antenna 15, will differ from the voltage $e_{14}$, induced in antenna 14, by a phase lag which depends upon the length of C. The amount of phase lag $\phi$ can easily be shown to be $$\phi = \frac{2\pi d}{\lambda} \sin \beta \qquad (5)$$

where:

$\lambda$ is the wave length of the radiation impinging upon the antennae.

The combined voltages $e_{14}$ and $e_{15}$ appear at the junction 18, therefore, $$e_{18} = e_{14} + e_{15} = E \cos \omega t + E \cos \left( \omega t - \frac{2\pi d}{\lambda} \sin \beta \right) \qquad (6)$$

Figure 3:
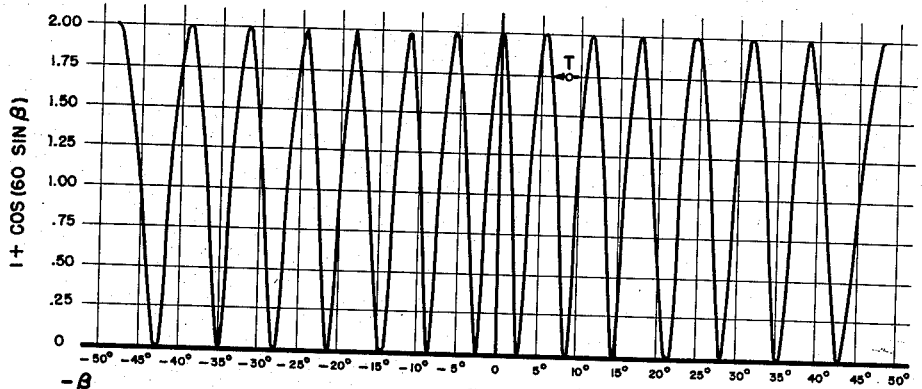
FIG. 3 is a chart of the antenna pattern of an idealized interferometer type antenna system for various target bearing angles.

In FIG. 3, the interferometer output voltage $e_{18}$ is plotted for various values of the bearing angle $\beta$ with the assumption that $$\frac{2\pi d}{\lambda} = 60$$

a value frequently encountered in practice.

It can be seen that a signal null exists for a number of values of $\beta$, as for example 3°, 9°, etc. Therefore, if a target were to be positioned outside the antenna lobes, that is to say at $\beta=3°$, $\beta=9°$, etc., the missile would receive no indication of the target's presence or location.

A continuous phase shifter 21 (FIG. 2) is inserted in arm 16 of the interferometer to remove the possibility of the existence of blind spots as described with respect to the null points 3°, 9°, etc. The phase shifter continuously shifts the phase of the signal received by antenna 15 so that the amplitude of the received signal fluctuates between zero and a relative amplitude of 2. The chart of FIG. 3 is no longer illustrative of the received signal, but the nature of the signal derived from the interferometer and utilized for steering purposes can be understood by reference to this chart.

The phase shifter advances the phase of the signal received by antenna 15 thereby resulting in an apparent movement of the lobes of FIG. 3 at a constant rate $\omega_s$, for example, from left to right. If a target were located at "T" and the missile were on a collision course ($\beta=0$) then each successive peak of the received signal would be separated equally in time. In other words, the phase difference between the received signal and the phase introduced by the phase shifter 21 remains constant. But if the target possessed relative motion ($\beta \neq 0$) in the direction from right to left, then the time between each successive peak of the received signal would decrease and conversely, if the target motion were from left to right, the time between peaks would increase. Consequently, target motion either right or left can be detected by determining whether the phase of the received signal is either advancing or receding from the phase introduced by the phase shifter 21.

Quantitatively, the received signal can be expressed as $$e_{18}^* = E \left[ \cos (\omega t + \omega_s t) + \cos \left( \omega t - \frac{2\pi d}{\lambda} \sin \beta \right) \right] \qquad (7)$$

where:

$e_{18}^*$ is the voltage at junction 18 including the effects of the continuous phase shifter 21; and
$\omega_s$ is the angular rate of phase shift added to the voltage $e_{15}$ by phase shifter 21.

By the application of trigonometric identities, Equation 7 can be rewritten as $$e_{18}^* = 2E \cos \left( \omega t + \frac{\omega_s t}{2} - \frac{2\pi d}{\lambda} \sin \beta \right) \cdot \cos \left( \frac{\omega_s t}{2} + \frac{\pi d}{\lambda} \sin \beta \right) \qquad (8)$$

In Equation 8, the term cos $$\left( \omega t + \frac{\omega_s t}{2} - \frac{2\pi d}{\lambda} \sin \beta \right)$$

can be considered as a carrier wave with the term cos $$\left( \frac{\omega_s t}{2} + \frac{\pi d}{\lambda} \sin \beta \right)$$

representing the modulation impressed thereupon. Therefore, the detected receiver output $e_r$, comprising the positive portion of the modulation envelope of $e_{18}^*$, is given by $$e_r = E \cos \left( \omega_s t + \frac{2\pi d}{\lambda} \sin \beta \right) \qquad (9)$$

Obviously, the received signal $e_{18}^*$ is complex and the foregoing treatment of Equation 8 is intended only to approximate the signal rather than to be mathematically rigorous.

It is evident from Equation 9 that information as to target bearing is present in the receiver output in terms of the phase of the receiver output with respect to the scanning phase $\omega_s t$. It will be realized, however, that so long as $\sigma$ remains constant the missile is proceeding along a collision course. Therefore, it is important to consider the case wherein $\beta$ does not equal zero, and hence contributes to a variation in $\sigma$.

Equation 9 can be rewritten to make $\beta$ variations apparent therein as follows:

$$e_r = E \cos \left( \omega_s t + \frac{2\pi d}{\lambda} \int \dot{\beta} \cos \beta \, dt \right) \qquad (10)$$

In a conventional discriminator, there is normally provided an input signal which is characterized by excursions from a constant center frequency $f_c$ in accordance with the modulating signal $f_m$. The discriminator operates symmetrically about $f_c$ to recover the modulating signal $f_m$. In effect, therefore, a discriminator differentiates the phase of the input signal and removes the constant frequency terms occurring therein.

The derivative of the phase of the receiver signal is:

$$\frac{d}{dt} \left( \omega_s t + \frac{2\pi d}{\lambda} \int \dot{\beta} \cos \beta \, dt \right) = \text{frequency} = \omega_s + \frac{2\pi d}{\lambda} \dot{\beta} \cos \beta \qquad (11)$$

Since $\omega_s$ is a constant frequency term, the output of a discriminator supplied with $e_r$ as an input will equal $\dot{\beta} \cos \beta$.

In the prior system, the ability of a discriminator to detect the rate of change of phase of an input signal was utilized to provide steering signals. There, a balanced modulator combined the output of the receiver with the output of an angle modulated oscillator. The oscillator deviation was controlled by a rate gyroscope, so that the steering signal $\dot{\sigma}_c$ output of the discriminator was $$\dot{\sigma}_c = f(\omega) (N\dot{\psi} - \dot{\beta} \cos \beta)$$

where $f(\omega)$ represents the transfer characteristic of the discriminator and various filters included within the system.

The purpose of the gyroscope compensation factor N can now be made apparent. The required steering signal appears in Equation 3. However, an undesired term, $\cos \beta$, is inseparably present in the discriminator output. The presence of $\cos \beta$ in the signal prevents the exact determination $\dot{\sigma}$ unless the value of $\psi$ be reduced in proportion to $\cos \beta$. In the prior and in the present systems, no attempt is made to evaluate $\cos \beta$ precisely. Instead, what is adjudged to be a reasonable maximum value for $\beta$ is assumed and the gyroscope compensation factor adjusted approximately equal thereto.

That is, it can reasonably be expected that $\beta$ will not exceed 30° and it would therefore appear that the value of N should be 0.866, which is equal to $\cos 30°$. It has been determined, however, that missile stability and performance is improved when N is equal to $0.925 \pm .005$, and, further, that there must be close adherence to that value. The reasons underlying the choice of the designated value of N are not set forth in detail as they do not depend upon factors within the scope of the present invention. The particular value of N is given merely by way of example to indicate the burden of tolerance in maintaining N upon the prior and present homing system.

Fundamentally, the operation of the prior interferometer homing system has been shown. Briefly, the present invention operates in an identical fashion up the point of applying the receiver output $e_r$ to a discriminator to obtain steering signals. According to the present invention, the discriminator is eliminated and the received output signal is applied to a device capable of measuring the difference between the phase of the received signal and the missile weather-cock angle $\psi$. The difference in phase determines the bearing angle $\sigma$ of the line-of-sight. Thereafter, $\sigma$ is differentiated by means of a resistor-capacitor network to provide $\dot{\sigma}_c$, the steering signal.

Figure 4:
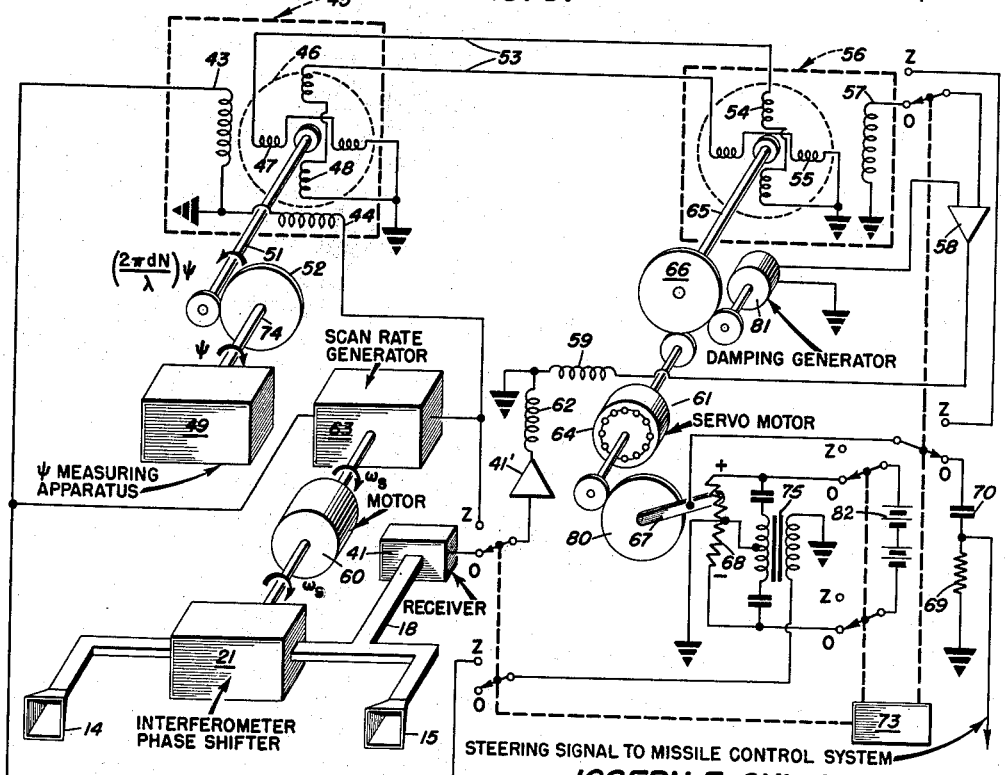
FIG. 4 is a functional block diagram of the present invention.

In FIG. 4, there appears a functional block diagram of the present invention. A scan motor 60 drives phase shifter 21 (FIG. 2) at a substantially constant speed to introduce the phase rate $\omega_s$ into the received signal. A two phase reference voltage generator 63 provides quadrature reference voltages having an angular velocity equal to the phase rate $\omega_s$. The generator 63 may comprise any suitable alternator together with appropriate shafting and gearing to achieve the desired reference voltage frequency.

The quadrature reference voltages are supplied to two stator windings 43 and 44 of a resolver, shown generally at 45, which functions as a phase adder, as will be more fully explained hereinafter.

The windings 43 and 44 are disposed in space quadrature to each other so that the excitation of said windings by quadrature voltages will produce a revolving magnetic field. The resolver rotor 46 carries two windings 47 and 48 likewise disposed in space quadrature so that the revolving field generated by the stator windings 43 and 44 will induce a two phase voltage in said rotor windings. The rotor 46 is linked to a gyroscopic $\psi$ measuring apparatus 49, to be described hereinafter, by a shaft 51 and gearing 52, thereby permitting the spatial relationship between the rotor windings 47, 48 and the stator windings 43, 44 to be maintained in accordance with $\psi$.

The two phase voltage induced in the rotor windings of resolver 45 is applied by conductors 53 to the rotor windings 54 and 55 of a second resolver 56. The windings 54 and 55 are disposed in space quadrature so that excitation of said windings by a two phase voltage creates a revolving magnetic field in resolver 56. The single phase voltage induced in the stator winding 57 of resolver 56 by the revolving magnetic field is amplified by an amplifier 58 and applied to the control field winding 59 of a conventional induction-type servo motor 61. The signal in wave-guide branch 18 is converted, amplified, and detected in a receiver 41. The receiver output, amplified in amplifier 41', excites the fixed field winding 62 of servo motor 61.

The servo motor rotor 64 is connected by a shaft 65 and gearing 66 to the rotor of resolver 56. The arm 67 of a potentiometer 68 is connected by gears 80 to the shaft 65 of resolver 56, via the rotor 64 of servo motor 61, so that the position of the arm 67 is related to the angular position of the rotor of resolver 56. A differentiating network comprising a resistor 69 and a capacitor 70 are connected in series from the potentiometer arm 67 to ground to provide an output steering signal $\dot{\sigma}_c$ proportional to the derivative of the angular position of the rotor of resolver 56.

The resolver 56, servo motor 61 and potentiometer 68 together with their associated linkages and excitation means comprise the phase measuring portion of the present invention.

The voltage appearing in the arm of the potentiometer 68 is proportional to the term $N\psi - \sin \beta$ and therefore, upon differentiation by the network 69-70, a steering signal proportional to $N\dot{\psi} - \dot{\beta} \cos \beta$ is obtained.

The planned trajectory of the missile guided by means of the present invention includes three phases of flight control. The first portion of the trajectory is the boost phase in which the missile is accelerated to supersonic speeds along a stabilized but unguided course. The next portion of the trajectory is the midcourse phase during which the missile beam rides toward an intercept point with a target. Finally, as the presence of a target is detected, the present invention is brought into operation. Prior to the acquisition of a target in the final flight phase, it would ordinarily be possible for servo motor 61 to drift randomly and therefore for potentiometer arm 67 to have a random initial location. The initial position of potentiometer arm 67 is unimportant so far as misslie steering signals are concerned since the steering signal depends upon the rate of potentiometer arm movement. It is possible, however, that during the random movement of servo motor 61, potentiometer arm 67 will be near to or upon its limit of motion. Then, upon reception a signal requiring further movement in the limited direction, no arm motion could occur and hence steering signals could not be provided.

To prevent servo motor 61 from drifting and to insure that sufficient travel of potentiometer arm 67 is available for the homing phase of flight, potentiometer arm 67 is maintained in a centered position by an arrangement including a multiple contact zeroing relay 73. During the boost and beam riding phases, the contacts of relay 73 are in the Z position. Potentiometer 68 is then energized by one phase of reference voltage generator 63 applied through a transformer 75. The remaining phase of generator 63 is applied through amplifier 41' to winding 62 of servo motor 61. The voltage at potentiometer arm 67 is substituted for the resolver input to amplifier 58 thereby causing servo motor 61 to seek the null or center position of potentiometer 68. Upon acquisition of a target, relay 73 is switched to the operate, O, position in which the apparatus has been previously described.

The operation of the present invention depends primarily upon the fact that the voltages induced in the rotor winding of resolver 45 and the stator winding of resolver 56 differ from their respective exciting voltages by a phase angle. The phase angle difference is determined by the spatial orientation of the various rotor windings with respect to their associated stator windings. Therefore, the voltage induced in the rotor windings 47 and 48 of resolver 45 is $e_s \angle \phi_1$, where $\phi_1$ is the space angle relationship between the rotor and the stator of resolver 45. Since $\phi_1$ is controlled by the $\psi$ measuring apparatus 49, as modified by the ratio of the gears 52, the voltage $e_{48}$ induced in rotor winding 48 is $$e_{48} = K e_s \bigg/ \omega_s t + \frac{2\pi dN}{\lambda}\psi \tag{13}$$

where the number $$\frac{2\pi dN}{\lambda}$$

comprises the ratio of the gears 52.

The amplitude of the induced voltage $e_{48}$ may, of course, differ from the amplitude $e_s$ by the ratio K of the number of stator turns to the number of rotor turns. The voltage induced in rotor winding 47 is in quadrature with the voltage $e_{48}$ and need not be referred to separately.

It is possible, by means of a resolver, to add or subtract a phase angle to the exciting voltage $e_s$ equal to the space angle through which the resolver rotor is rotated. Whether addition or subtraction is performed depends upon the direction of the revolving magnetic field. Phase subtraction is accomplished whenever the rotor movement is in the same direction as the revolving magnetic field and phase addition is accomplished whenever the rotor movement is in opposite direction to that of the revolving field. Obviously, there can be several arrangements of the resolver 45 to provide phase addition since the direction of rotation of the revolving field is reversible simply by interchanging the input reference voltages. The exact manner of interconnecting the stator windings 43 and 44 with the exciting voltage source 63 and the rotor 46 with the $\psi$ measuring apparatus 49 is unimportant as long as the function of phase addition is performed by the resolver 45.

It is important to observe that the revolving magnetic field in the resolver 45 makes possible addition to the phase angle of the reference voltage without modulating the amplitude of the phase altered voltage. That is to say, the application of a resolver according to the present invention differs from conventional applications wherein a resolver is utilized to perform trigonometric operations. In the latter instance, it is normally desired to resolve a single phase exciting voltage into components according to the angular position of the resolver. Thus, it is conventional to apply an exciting voltage $E_1 \cos \omega_1 t$ to a stator winding and recover from the rotor windings the components $E_1 \sin \phi (\cos \omega_1 t)$ and $E_1 \cos \phi (\sin \omega_1 t)$. In the present application, however, amplitude modulation as a function of rotor angle $\phi$ is undesired and hence eliminated by the unconventional provision of a revolving magnetic field.

The voltage induced in the rotor winding 48 and its quadrature component, the voltage induced in winding 47, generate a revolving magnetic field in resolver 56. The voltage induced in stator winding 57 of resolver 56 is free from amplitude modulation, but shifted in phase by the amount $\phi_2$, the angular position of the rotor with respect to the stator. Therefore, the voltage $E_{57}$ induced in stator winding 57 is $$E_{57} = Ke_{48} \angle \phi_2 \qquad (14)$$

where K again represents the effective turns ratio between the rotor and stator windings.

As will be understood, the servo motor 61 is incapable of developing starting torque so long as the voltage $e_r$ applied to the control winding 59 is in phase with the voltage applied to winding 62. However, whenever a phase difference exists between the voltages applied to the servo motor windings, a torque is developed by the servo motor which is applied to rotate the rotor of resolver 56. The control winding 59 is phased with respect to the fixed field winding 62 so that the servo motor torque causes the rotor of the resolver 56 to turn in a direction to reduce the phase difference between the voltages applied to the fields. If desired, a damping generator 81 may be provided to stabilize the operation of servo motor 61.

For zero servo motor torque, the phase angle of the voltage $e_{62}$ applied to winding 62 is equal to the phase angle of the voltage $e_{59}$ applied to the winding 59.

Furthermore, the phase angle of $e_{59}$ is equal to the phase of $e_{57}$. Therefore, phase angle of $e_{62}$ = phase angle of $e_{59}$ (15)

and the phase angle of $e_{62}$ is equal to $$\left(\omega_s t - \frac{2\pi d}{\lambda} \sin \beta\right)$$

It follows from Equations 14 and 15 that $$\omega_s t + \frac{2\pi d}{\lambda} \sin \beta = \omega_s t + \frac{2\pi dN}{\lambda} \Psi + \phi_2 \qquad (16)$$

therefore $$\frac{2\pi d}{\lambda} \sin \beta - \frac{2\pi dN}{\lambda} \Psi - \phi_2 = 0 \qquad (17)$$

or $$\phi_2 = -\left(\frac{2\pi dN}{\lambda} \Psi - \frac{2\pi d}{\lambda} \sin \beta\right) \qquad (18)$$

The negative sign may be removed either by idler gears or simply by reversing the polarity of voltage applied to potentiometer 68.

By arranging the gear ratio R between the resolver rotor and potentiometer arm 67 to be $$R = \frac{\lambda}{2\pi d} \qquad (19)$$

the voltage $e_{67}$ at the potentiometer arm will be $$e_{67} = K_s R \phi_2 = K_s(N\psi - \sin \beta) \qquad (20)$$

where $K_s$ is a factor depending upon the voltage applied to the potentiometer by the battery 82.

Upon differentiation by the network, a steering signal $\dot{\sigma}_c$ is derived which is $$\dot{\sigma}_c = f_1(\omega)(N\dot{\psi} - \dot{\beta} \cos \beta) \qquad (21)$$

where $f_1(\omega)$ represents, in part, a time lag introduced by the network and is desired to improve performance of the entire missile. It will be observed that the steering signal derived by the present means is identical with that derived by the prior means.

The construction and operation of the present invention have been set forth without the disclosure in detail of the $\psi$ measuring apparatus 49, for the reason that said apparatus may comprise any suitable device capable of maintaining a fixed orientation in space, as for example, a free gyroscope.

Figure 5:
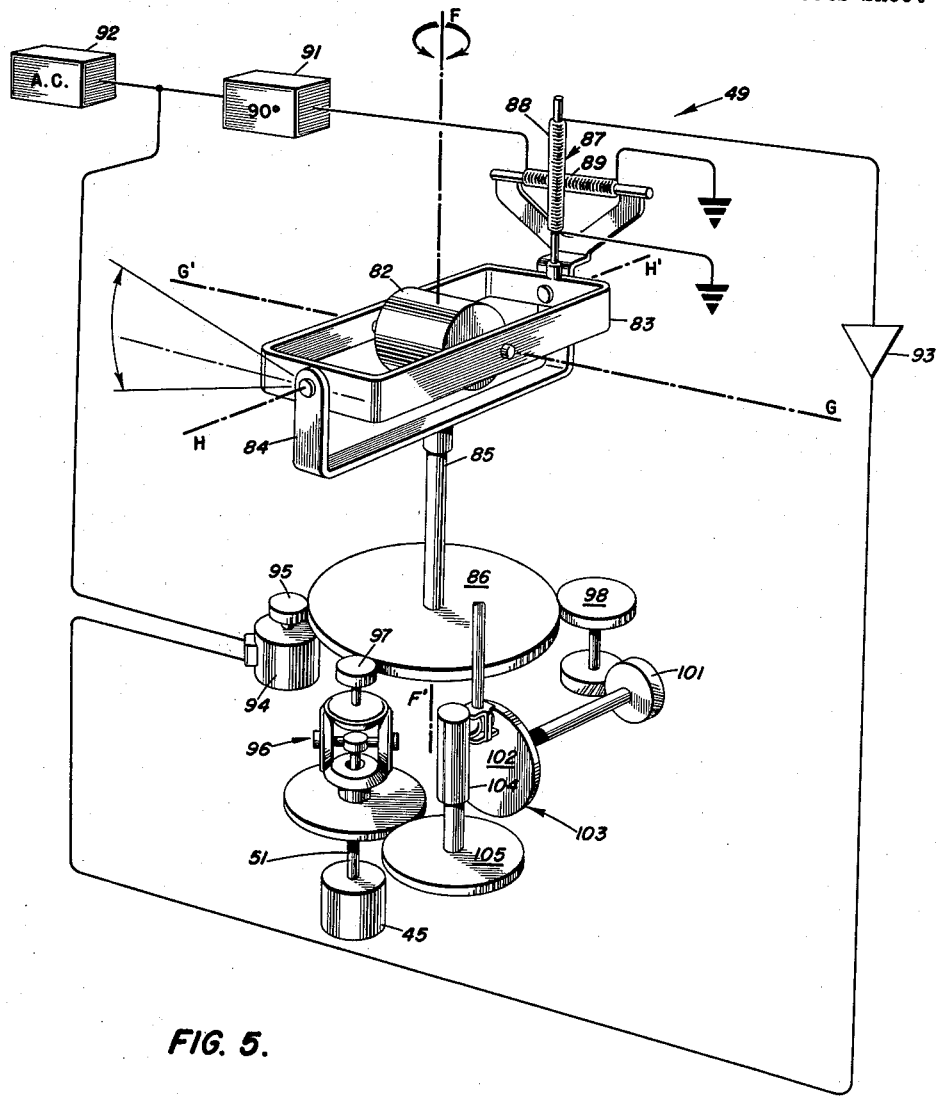
FIG. 5 is an oblique diagrammatic view of a single-degree-of-freedom free gyroscope preferably forming an element of the present invention.

In FIG. 5, there is shown a modified form of free gyroscope having but a single degree of freedom. The single-degree-of-freedom free gyroscope has the advantage of eliminating troublesome gimbal lock as would occur, for example, should the gyroscope rotor tumble.

The $\psi$ measuring apparatus 49 comprises a gyroscope rotor 82 which is driven at suitable speed by any conventional means. The rotor 82 is supported by pivotally mounted gimbals 83, 84 so as to be free to rotate about any of the axes FF', GG', or HH'. The gimbal 84 is rigidly fixed to a shaft 85 secured to a ring gear 86. The gyroscope rotor 82, gimbals 83, 84, and ring gear 86 are pivotally supported by a suitable thrust bearing (not shown), so as to be free to rotate about the axis FF'.

A sensing device 87 is arranged to provide an output proportional to pivotal movement of the gimbal 83 about the axis HH'. The sensing device 87 may suitably comprise a differential transformer having a first winding 88 fixed to the gimbal 83, and a second winding 89 fixed to the gimbal 84 so as to be rotatable therewith. Whenever the winding 88 is perpendicular to the winding 89, there will be no voltage induced in winding 88 for the reason that the conductors thereof are parallel to the magnetic flux generated by winding 89. Whenever the plane of gimbal 83 is tipped away from perpendicularity with the plane of gimbal 84, winding 88 will no longer be perpendicular to winding 89 and hence there will be a voltage induced in winding 88.

Exciting current for the winding 89 is obtained from a phase shifter 91, which receives current from a source 92 of alternating current. The phase shifter 91 provides a component of current in quadrature with the output of the source 92. The voltage induced in the winding 88, when tipping of the gimbal 83, occurs, is highly amplified by an amplifier 93 and applied to the control field winding of a servo motor 94. Alternating current from the source 92 is applied to the fixed field winding of servo motor 94. Servo motor 94 is fixed to the missile and applies torque to ring gear 86 through a pinion 95 upon the appearance of an output from amplifier 93.

One input shaft of a differential 96 is coupled to ring gear 86 through a pinion 97. A pinion 98 and helical gears 101 apply motion of ring gear 86 to the disk 102 of a conventional ball-disk integrator 103. The roller output member 104 of integrator 103 is coupled through gears 105 to the second input shaft of differential 96. Resolver 45 is driven by the output shaft of differential 96.

The motion of the output shaft of differential 96 is propotrional to the sum of the motions of the input shafts. The integrator 103 serves as a variable gear ratio for transmitting motion of the ring gear 86 to resolver 45. Approximately 80 percent of the motion of resolver 45 is contributed by pinion gear 97, the balance of the motion being made up by integrator 103 and gears 105. Since the motion transmitted by the integrator is variable through a range of approximately 300 percent, the ratio of motion of resolver 45 to ring gear 86 may be adjusted to a high degree of accuracy.

The single-degree-of-freedom free gyroscope has the advantage of elminating gimbal lock. That is, if precession about the axis HH' is permitted to occur to the point where the axis GG' is aligned with the axis FF', a reactive torque equal to the rotor driving torque is applied to the gimbal 84. Since the rotor driving torque is relatively large, the gimbal 84 would be driven about the axis FF' at high speed. In the event of gimbal lock, the system would completely fail to function. It is therefore highly desirable to employ a gyroscopic apparatus in which the gimbal lock condition is never permitted to arise.

As there are two planes in which $\psi$ and $\beta$ measurements are required, namely, the pitch and yaw planes, the apparatus of FIG. 4 must be duplicated for each plane. The steering signal output of the respective pitch plane and yaw plane devices must also be suitably combined to provide homing operation. The means for combining the pitch and yaw signals form no part of the present invention and are not set forth herein. It is sufficient to note that the position of a target located at any place with respect to the missile can be determined by ascertaining the pitch plane range and bearing and the yaw plane range and bearing. It is necessary, therefore, to consider only a single plane of operation herein, either yaw or pitch, as the mode of operation of the present invention is identical in either plane.

Choosing the yaw plane as an example, the $\psi$ measuring apparatus 49 is mounted in the missile so that the axis FF' is perpendicular to the yaw plane, or, in other words, lies within the pitch plane. Assuming that the gyroscope rotor 82 is suitably energized, the rotor 82 will tend to maintain a fixed orientation in space. When the orientation of the rotor 82 is changed by external forces acting to rotate the rotor about the axis FF', precession will occur about the axis HH', that is, gimbal 83 will tip. But tipping of the gimbal 83 causes servo motor 94 to be energized. The result of the tendency of the rotor to precess with turning of the gimbal 84 about the axis FF' is that a torque is applied to ring gear 86 to counteract the external forces giving rise to said precession. The axis GG' therefore remains perpendicular to the axis FF'. Missile $\psi$ movement in the yaw plane causes the resolver 45 to be carried around the axis FF'. Obviously, so far as the introduction into the system of appropriate $\psi$ signals is concerned, there is no difference between regarding the resolver 45 as fixed, with the gyroscope rotating about the axis FF', as was done in the discussion of the operation of the system with reference to FIG. 4, and the actual case wherein the gyroscope is fixed in space with the resolver rotating about the gyroscope.

The attainment of the objects of the present invention can now be discussed. Since according to the present invention, $\psi$ signals are introduced by means other than an angle modulated oscillator and the discriminator is omitted, there is no possibility of a misalignment between the oscillator center frequency and the discriminator center frequency. Misalignments, formerly frequent, no longer can occur and thus the major source of bias and false steering signals is eliminated.

Incidental to the problem of misalignment as it formerly existed, there were provided thermally stabilized ovens, regulated power supplies, automatic zeroing circuits, etc. for the purpose of oscillator stabilization. The elimination of such incidental equipment as was necessary to reduce misalignment bias reflects advantages in the form of weight reduction and circuit amplification. In addition, it is no longer necessary to make allowance for a considerable warmup period before placing the equipment in operation.

As has been previously mentioned, there is a strict tolerance on the value N, the gyroscope compensation factor. Formerly N was determined by adjusting the frequency deviation of the $\psi$ oscillator. The value of N could not be accurately determined nor relied upon to maintain a fixed value. According to the present invention, however, N is simply fixed as a gear ratio, thereby rendering it possible to set N with precision. In addition, it is now possible to maintain stringent tolerances in the value of N.

Obviously many modifications and variations of the present invention are possible in the light of the above teachings. It is therefore to be understood that within the scope of the appended claims the invention may be practiced otherwise than as specifically described.

What is claimed is:

1. Apparatus for guiding a vehicle toward a source of radiant energy, comprising, a pair of spaced antennae on the vehicle for receiving energy from the radiating source, said energy being disposed in substantially plane wave fronts, means for shifting the phase of the energy received by one of said antennae, means combining said phase shifted energy with the energy received by the other antenna of said pair thereby providing a combined signal having a phase dependent upon the bearing of the energy source from the vehicle, a generator coupled to said phase shifter to provide an alternating reference voltage, a stable element in said vehicle, means receiving said reference voltage and mechanically coupled to said stable element to add to the phase of said reference voltage in proportion to the spatial rotation of said vehicle, means including a two phase induction motor having a first stator winding energized by the output of said phase adding means, a second stator winding energized by said combined signal voltage and a rotor responsive to a phase difference between the exciting voltages said windings to provide a space angle of rotation proportional to the difference between the spatial rotation of the vehicle and the bearing of the energy source from the vehicle, and means for differentiating the space angle output of said last-named means to provide steering signals for the vehicle.

2. Apparatus as claimed in claim 1, wherein said phase adder comprises a resolver including quadrature stator windings and quadrature rotor windings, said reference voltage being applied to said stator windings, said stable element being coupled to said rotor to rotate the same in proportion to the rotation of said vehicle.

3. Apparatus as claimed in claim 2 with additionally, a second resolver including quadrature rotor windings and a stator winding, the rotor windings of said second resolver being interconnected with the rotor windings of said first resolver, the rotor of said second resolver being mechanically connected to the rotor of said induction motor, the stator winding of said second resolver supplying said phase added voltage to said first motor winding.

4. A homing system for guiding an aerial vehicle toward a radiating object, comprising, a pair of spaced antennae mounted on the vehicle for receiving signals from the radiating object, means for continuously shifting the phase of the signal received by one of said antennae, means for combining said phase shifted signal with the signal from the other of said antennae to provide a signal containing information of the bearing of said radiating object in terms of phase, means for detecting said combined signal, a generator coupled to said phase shifter for generating a reference voltage, means for altering the phase of said reference voltage, a stable element for controlling said phase altering means in accordance with the rotation of said vehicle in the plane containing said pair of antennae, means receiving said phase altered reference voltage and said detected signal and including a servo motor for providing rotation proportional to the phase difference between said phase altered voltage and said detected signal, and means for differentiating said servo motor rotation to provide guidance signals for said vehicle.

5. Apparatus as claimed in claim 4, wherein said stable element comprises a gyroscope having a rotor and gimbals for supporting said rotor, means for detecting precession of said gyroscope, means controllable by said precession detecting means for applying torque to said gimbals, and means for coupling said gyroscope gimbals to said phase altering means.

6. Apparatus as claimed in claim 5, wherein said means for coupling said gyroscope gimbals to said phase altering means comprises, a ring gear secured to said gimbals, a differential having a pair of input shafts and an output shaft, one of said input shafts being driven directly by said ring gear, a speed changing mechanism driven by said ring gear and driving the other of said differential input shafts, said differential output shaft being coupled to said phase altering means.

7. In an interferometer homing device for steering an aerial missile to a point of collision with a target, said device including a pair of separated antennae, a phase shifter, and a receiver for detecting the modulation envelope of the signal in said interferometer; a gyroscope for detecting angular motion of said missile, an alternator providing a voltage fixed in phase with respect to said phase shifter, a first resolver including a rotor having a winding and a stator having a winding, the rotor of said first resolver being coupled to said gyroscope, said stator winding receiving excitation from said alternator, the voltage induced in said rotor winding thereby being displaced in electrical phase in proportion to the angular displacement of said missile, a second resolver including a rotor having a winding and a stator having a winding, the rotor winding of said second resolver being electrically connected to said first resolver rotor winding, a servo motor delivering torque to said second resolver rotor and receiving a first electrical input from said receiver and a second electrical input from said second resolver stator winding and arranged to develop torque whenever the phase of said first electrical input differs from the phase of said second electrical input, said torque causing movement of said second resolver rotor to reduce the difference in phase between said first and second electrical inputs, a potentiometer having its arm connected to said second resolver rotor and rotatable therewith, and a differentiating network electrically connected to said potentiometer arm to provide a signal proportional to the rate of change of the position of said potentiometer arm.

References Cited by the Examiner
UNITED STATES PATENTS 2,701,875    2/55    Baltzer _____ 244—14.2

SAMUEL FEINBERG, *Primary Examiner.*

NORMAN H. EVANS, *Examiner.*